United States Patent [19]

Troost et al.

[11] 4,146,748

[45] Mar. 27, 1979

[54] SWITCHING ARRANGEMENT FOR PULSE CODE MODULATION TIME DIVISION SWITCHING SYSTEMS

[75] Inventors: Marcel Troost; Karlheinz Neufang, both of Munich, Fed. Rep. of Germany

[73] Assignee: Siemens Aktiengesellschaft, Munich, Fed. Rep. of Germany

[21] Appl. No.: 790,968

[22] Filed: Apr. 26, 1977

[30] Foreign Application Priority Data

Apr. 29, 1976 [DE] Fed. Rep. of Germany ....... 2618922

[51] Int. Cl.$^2$ .............................................. H04J 3/00
[52] U.S. Cl. ................................................ 179/15 AT
[58] Field of Search ...................... 179/15 AT, 15 AQ

[56] References Cited

U.S. PATENT DOCUMENTS

| | | | |
|---|---|---|---|
| 3,735,049 | 5/1973 | Buchner et al. ................ | 179/15 AQ |
| 3,818,142 | 6/1974 | Edstrom et al. ................ | 179/15 AT |
| 3,914,552 | 10/1975 | Neufang ......................... | 179/15 AQ |

*Primary Examiner*—Thomas W. Brown
*Attorney, Agent, or Firm*—Schuyler, Birch, Swindler, McKie & Beckett

[57] ABSTRACT

A switching arrangement for pulse code modulation (PCM) time division multiplex telecommunication switching system is described. The frame storages for incoming and outgoing directions of transmission as well as their address memories, and the crosspoint address memory form a memory unit. The frame storages are read-in in cyclic sequence and read out selectively and it is possible to transfer information from anyone of the frame storages to either the same PCM trunk or to the space division switching network. Thus, there is a possibility both for return switching to the same PCM trunk and for switching through other switching units in a time-space-space-time format.

3 Claims, 4 Drawing Figures

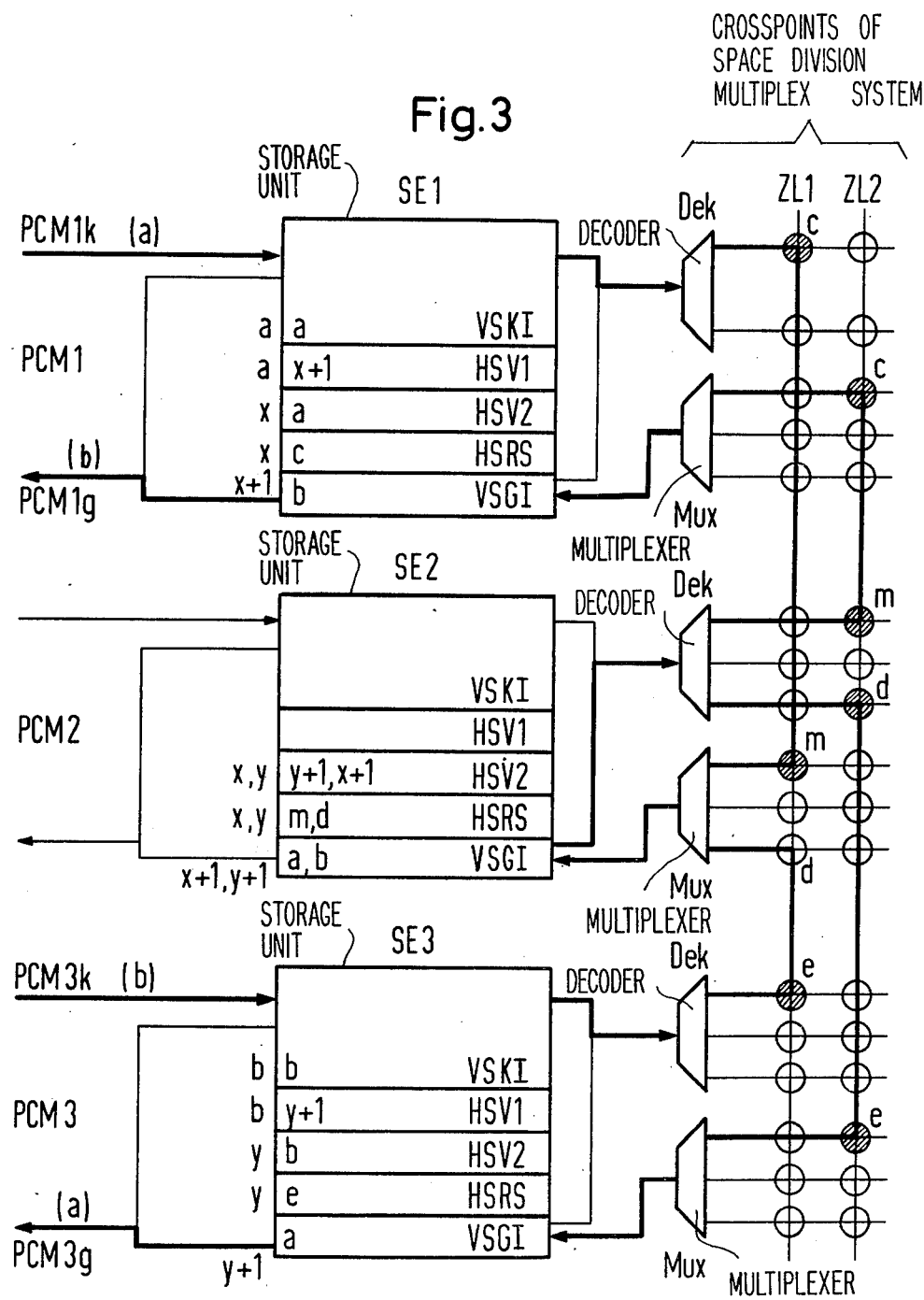

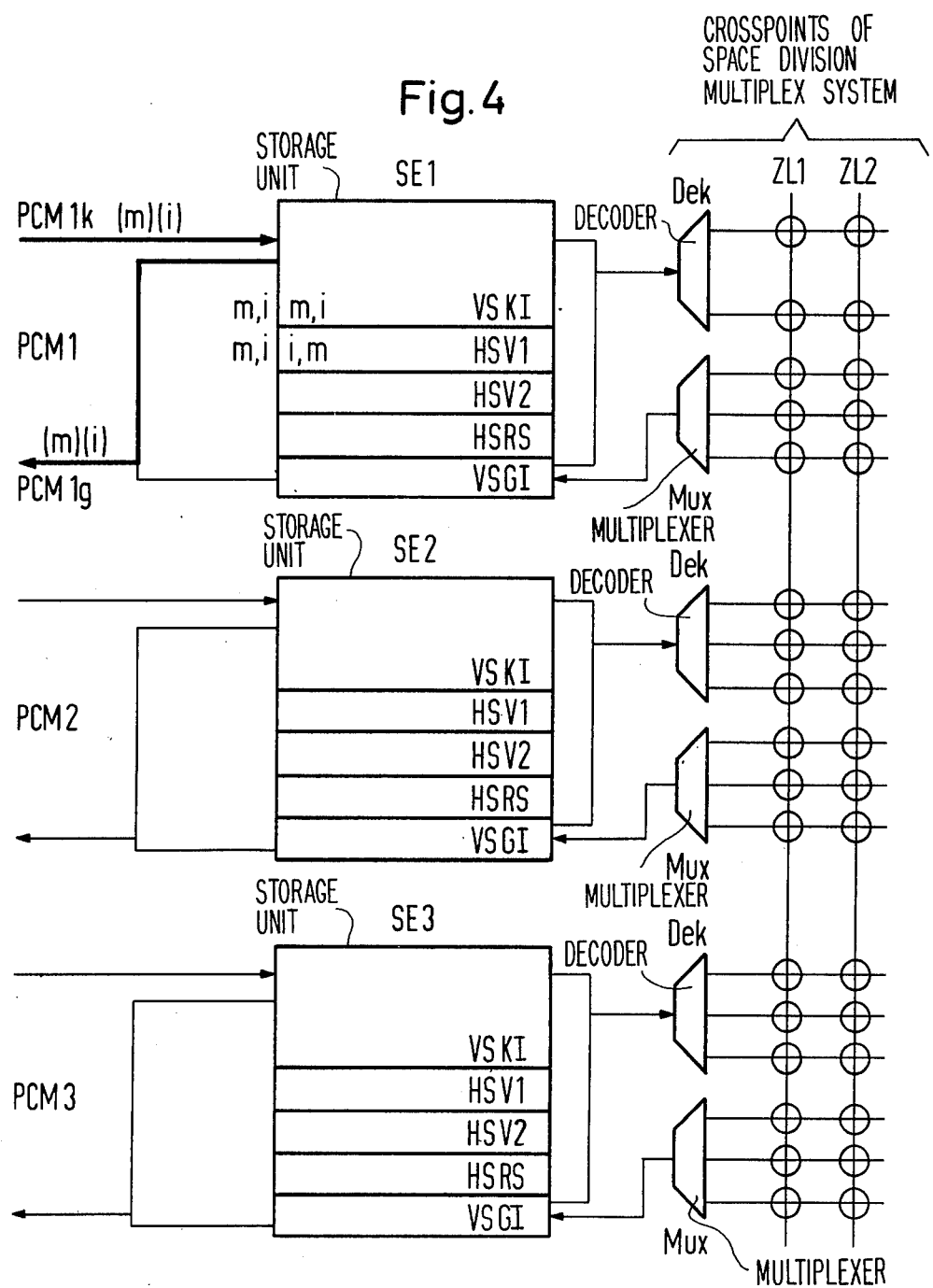

SWITCHING ARRANGEMENT FOR PULSE CODE MODULATION TIME DIVISION SWITCHING SYSTEMS

BACKGROUND OF THE INVENTION

The invention relates to a switching arrangement for pulse code modulation (PCM) time division multiplex switching systems having switching units assigned individually to the PCM time division multiplex primary trunks which have for each direction of transmission a frame storage for storing information, crosspoint elements in direct communication with the frame storages and address memories for activating the frame storages and the crosspoint elements and which, together with the other switching units, form a TDM switching network having a time-space-space-time switching configuration.

In a similar switching arrangement of known construction (cf. West German patent application No. P 21 08 745. 6-31) the frame storage for information for the incoming direction of transmission can be connected in a switching unit to one wire pair of the PCM time division multiplex trunk, and the frame storage for information for the outgoing direction of transmission is connected to the other wire pair of the PCM time division trunk. The read-in operation for the PCM time division multiplex trunk to the frame storage for the incoming direction of transmission and the read-out operation from the frame storage for information for the outgoing direction of transmission recur in successive cycles. A readout from the frame storage for information for the incoming direction of transmission can only take place toward a space-division section of the switching network. Accordingly, a read-in to the frame storage for the outgoing direction of transmission is only possible from this space-division switching network. Both the read-in to the space-division switching network portion and the readout from there occur randomly. In the course of one and the same call the same switching time position is used both for the random readout and for the random read-in operations. For this reason, a single address memory is sufficient for activating a frame storage for the incoming direction of transmission and a frame storage for the outgoing direction of transmission.

If a return switching operation to the same PCM primary trunk is to be effected in such a switching arrangement, i.e., from a time slot formed on the incoming pair of line wires to one formed on the outgoing line pair of the same trunk, a further switching unit is required. That switching unit is not connected to a PCM trunk, but its input and output are connected together. This switching unit is in communication with the switching units in a group of switching units in the same way via the space-division section of the switching network as the switching units connected to PCM trunks are in communication with one another.

In the switching arrangement of known construction an extremely unbalanced traffic situation may cause links in a space-division section of the switching network that connect together prespecified switching units to become busy resulting in traffic losses. This situation may likewise occur if, for reasons of safety, the switching units in question are provided in pairs and designed for accepting half the traffic load and if one of these parallel switching matrices fails.

Overall, the switching arrangement of known construction was not particularly suited for production by large-scale integration (LSI) techniques.

Therefore, it is an object of the invention to provide a switching arrangement of the type described hereinabove which permits easy return switching to the same PCM primary trunk, works substantially free of losses and without additional complexity and expense and is suitable for production by large-scale integration techniques.

SUMMARY OF THE INVENTION

The above and other objects are achieved in a switching arrangement of the type described hereinabove wherein frame storages and address memories are constituent parts of a memory unit allocated to individual lines. The frame storage sections are activated in successive cycles in the case of the read-in operations and are activated selectively in the case of the readout operations. Any one of the frame storage sections can be read both to the connected PCM time division multiplex trunk and to the space-division section of the switching network. In those address memory sections that cause the activation of the readout from the frame storage sections are stored, in a first area, the access addresses required for the selective readout to the PCM time division trunk and, in a second area, those required for the selective readout to the space-division section of the switching network.

The above described combination of frame storages and address memories into a storage unit in accordance with the principles of the invention permits the use of large scale integration manufacturing techniques.

In accordance with the invention, the frame storage sections for the incoming lines of the PCM trunks can be read out both toward the space-division section of the switching network and toward the associated outgoing lines of the PCM trunk (this reading occurs selectively). It is, for this reason, also possible to switch back to the outgoing line pair of the same PCM trunk without using an additional switching unit. In this case, the space-division section of the switching network is not actuated, however.

Since in the frame storage section, which is primarily designed for the outgoing lines of the PCM trunk, it is also possible to readout in both directions, that is, toward the space division section of the switching network and toward the outgoing lines of the PCM trunk, a PCM time division multiplex channel can be switched using a frame storage section of a switching unit assigned to a third PCM trunk if no more links are free in the space-division section of the switching network. In this case, the organization according to the invention of the address memory sections supplying the access addresses for the frame storage sections provides the means for control of this operation.

BRIEF DESCRIPTION OF THE DRAWINGS

The principles of the invention will be more readily understood by reference to the description of preferred embodiments, constructed accordingly, given hereinbelow and which are illustrated in the drawings as briefly described below.

FIGS. 2-4 are block-schematic diagrams of three of the FIG. 1 switching units forming constituent parts of a TDM switching network to illustrate three different switching possibilities.

DETAILED DESCRIPTION OF THE PREFERRED EMBODIMENT

Figure 1:
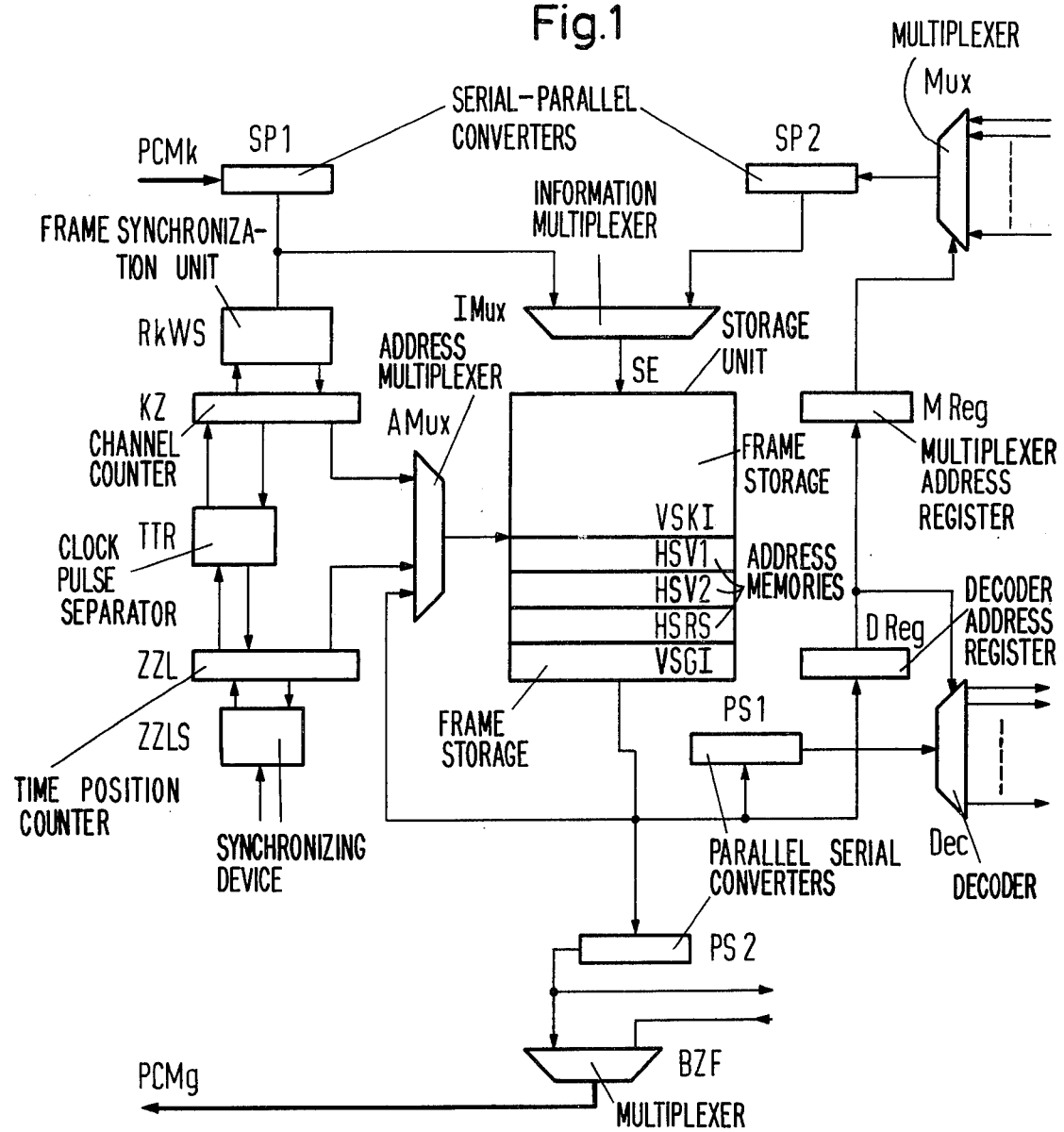
FIG. 1 is a block-schematic diagram illustrating the essential components of a switching unit embodying the invention and which is used in a PCM/TDM telecommunication system of the type described hereinabove.

A switching unit shown in FIG. 1 is allocated to a PCM time division primary trunk and is connected to an incoming line pair PCMk and an outgoing line pair PCMg of the trunk. The switching unit includes a storage unit SE which may be any suitable form of conventional digital storage device capable of being arranged in the following manner. It comprises a frame storage section VSKI into which are written PCM data incoming on the incoming line pair PCMk, a frame storage section VSGI into which are written data supplied via the space-division section of the switching network, address memory sections HSV1 and HSV2 containing the addresses for the acyclic activation of the frame storage sections, as well as data as to whether the reading of the frame storage sections must occur toward the connected TDM trunk or toward the space-division switching network, and an address memory section HSRS for the crosspoint addresses.

The PCM data incoming on line pair PCMk for the incoming direction of transmission are routed to frame storage section VSKI of the storage unit SE via serial to parallel converter SP1 and conventional information multiplexer IMux. Pulse-frame code words occurring on this line pair are routed additionally to a frame synchronization unit RKWS which then, when the pulse-frame code word has appeared several times in succession and at predetermined intervals, e.g., twice at a two-pulse frame interval, brings a channel counter KZ to its reset or initial position. The channel counter KZ counts bit clock pulses appearing on the PCM trunk and supplies in cyclic sequence time-slot addresses that identify the time slots on the line pair PCMk. The time slot addresses are transferred to storage unit SE so as to control from there the cyclic writing into frame storage section VSKI.

The channel counter KZ communicates via a clock-pulse separator TTR with a time position counter ZZL which, advanced by exchange clock pulses, supplies in cyclic sequence addresses of the switching time positions governing the switching processes within the switching unit shown. These addresses likewise travel via address multiplexer AMux to storage unit SE so as there to activate the address memory sections in cyclic sequence.

A conventional synchronizing device ZZLS serves the purpose of synchronizing the time position counter ZZL.

Access addresses are likewise fed to address multiplexer AMux and are read-out therefrom with the cyclic activation of address memory sections HSV1 and HSV2. These addresses provide for the selective activation of the frame storage sections VSKI and VSGI of storage unit SE. The distribution of the addresses transferred via address multiplexer AMux to the storage unit in the case of the write-in operations of the frame storage sections VSKI and VSGI which occur in successive cycles and in the case of the readout operations of frame storage sections VSKI and VSGI which occur selectively, as well as with the cyclic activation of address memory sections HSV1 and HSV2, occurs, in a known manner not shown herein, by time restrictions of the various types of activation at bit intervals formed within the time position intervals.

The crosspoints pertaining to the switching unit shown in the drawing are reached through multiplexer Mux and decoder Dec. These crosspoints (shown in FIGS. 2-4) form part of a conventional space-division switching network which interoperate with the time division switching unit, a number of which are provided in systems of the type here in question, in the manner described herein. Data coming from storage units SE of other switching units are fed to the switching unit shown via multiplexer Mux, serial to parallel converter SP2 and the aforementioned information multiplexer IMux of storage unit SE. The decoder Dec serves the purpose of passing on data read from the frame storage sections of storage unit SE and transferred thereto via parallel to serial converter PS1. The activation of of multiplexer Mux and decoder Dec is effected through addresses read from address memory section HSRS of storage unit SE and prior thereto transferred to address registers DReg and MReg.

Data to be sent from a frame storage section VSKI or VSGI directly to the PCM trunk are transferred via parallel to serial converter PS2 and multiplexer BZF to outgoing line wire PCMg. Multiplexer BZF is used for the bit stream junction if a similar switching unit is provided for load sharing.

Figure 2:
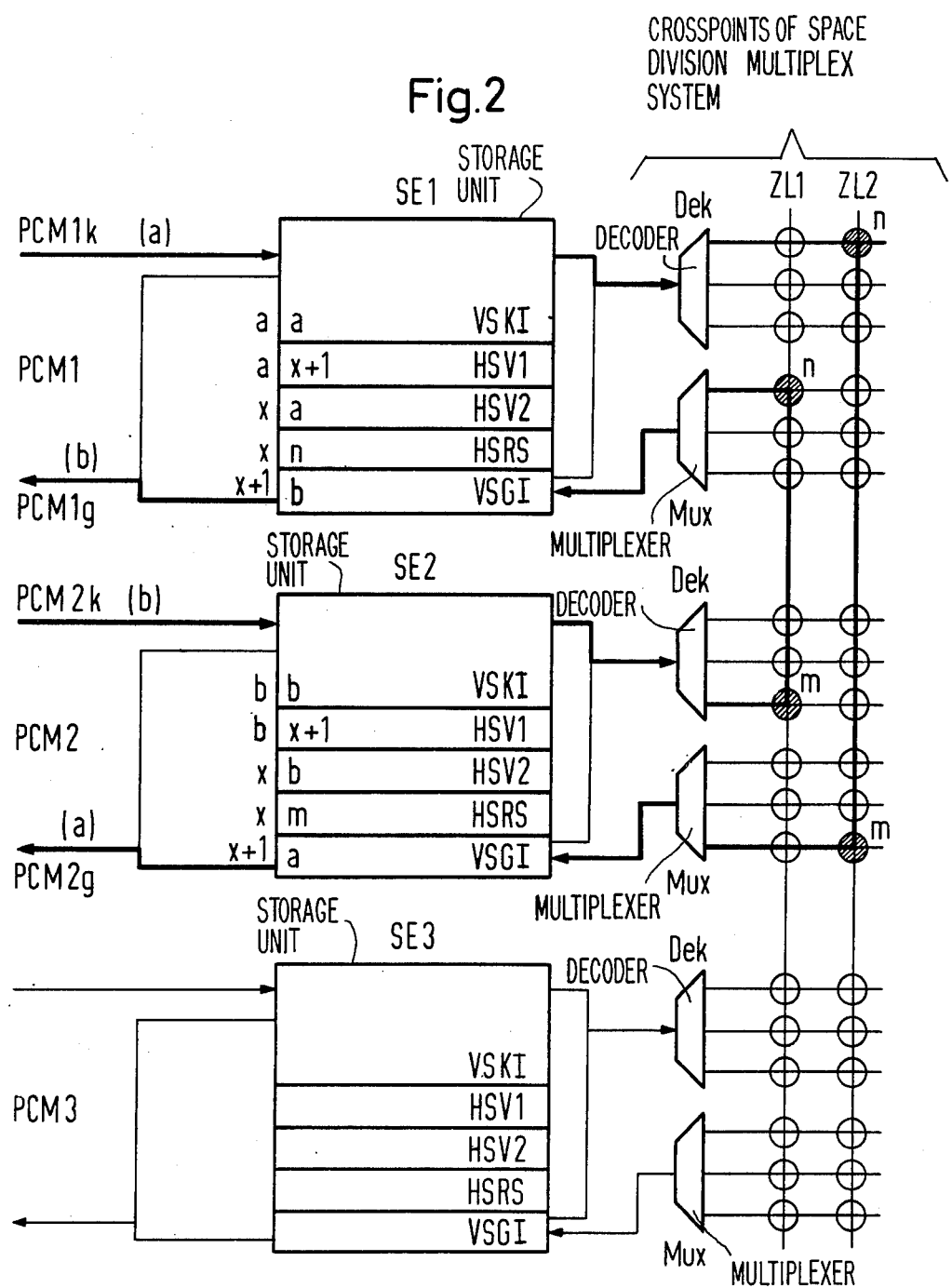

FIGS. 2-4 show the formation of three of the switching units described in connection with FIG. 1 into a section of a TDM switching network in a time-space-space-time configuration using links ZL.

A first typical operation of the switching arrangement according to the invention will now be described with reference to FIG. 2, it being assumed that a connection is to be established between a time slot a of PCM trunk PCM1 and time slot b of PCM trunk PCM2.

In this case, there are read-in during time slot a on incoming line pair PCM1k of PCM trunk PCM1 incoming data into a storage location (allocated to this time slot) of frame storage VSKI of storage unit SE1. In this example it is assumed that the time position x is to be used as a switching time position in the space-division section of the switching network and that the call is to be routed to the pair of crosspoints n associated with the switching unit of the first TDM highway. This means that in the storage location assigned to time position x in crosspoint address memory HSRS there is stored the address of the pair of crosspoints n, one of which is associated with decoder Dec and the other with multiplexer Mux.

The address of crosspoint pair m is entered in the storage location assigned to time position x of crosspoint address memory HSRS of the storage unit SE2 associated with PCM trunk PCM2.

Thus, the unit of information of time slot a held in the frame storage section of storage unit SE1 is input from there via link ZL2 into frame storage section VSG1 of storage unit SE2, namely, into the storage location allocated to time position x+1 due to the time delay caused by a parallel to serial and serial to parallel conversion and by a link trigger element not shown. From there this unit of information is read-out during the time position corresponding to time slot b to the outgoing line pair PCM2g of PCM trunk PCM2. For this purpose the address x+1 of frame storage section VSG1 is entered in the storage location allocated to time slot b of address memory section HSV1, so that when the address memory section is activated in successive cycles, during the time position of time slot b, the access address x+1 for the activation of frame storage section VSG1 and a trigger signal are supplied. The trigger causes the information carried by PCM trunk PCM1 to be read to the PCM trunk PCM2.

Like processes are performed for the opposite direction, i.e., data incoming on line pair PCM2k in time slot b are transferred to a storage location of frame storage section VSKI of storage unit SE2, from there via link ZL1 to a storage location of frame storage section VSGI of storage unit SE1 and from there, finally, during a time positon of time slot a on outgoing line pair PCM1g of PCM trunk PCM1.

A second operation of the arrangement in accordance with the invention will be described with reference to FIG. 3. This operation involves a connection of time slot a formed on PCM trunk PCM1 to time slot b formed on PCM trunk PCM3 in the situation where a direct link connection between storage units SE1 and SE3 is not available. The call is then completed via frame storage section VSGI of storage unit SE2.

The operations involved in writing data from time slot a of TDM trunk PCM1 into a frame storage section VSKI of storage unit SE1, as well as the retransmission thereof, in this case via link ZL1, to frame storage section VSG1 of storage unit SE2 during switching time position x are the same as in the example described hereinabove.

Unlike the example described hereinabove, the unit of information from the time slot transferred in this way to storage location x+1 of the frame storage section VSGI of storage unit SE2 is applied to the space-division section of the switching network during a second switching time position y. Accordingly, address memory section HSV2 contains in its storage location assigned to switching time position y the address of storage location x+1 in frame storage portion VSGI of storage unit SE2, as well as a criterion that determines the direction of signal flow with the space-division section of the switching network. In this connection, the crosspoint address memory HSRS of the storage unit contains the addresses of crosspoint pairs d. The unit of information of the time slot buffered in frame storage section VSGI of storage unit SE2 is thus retransmitted during the time position y via link ZL2 to frame storage section VSGI of storage unit SE3, namely, to the storage location with the address y+1, for which purpose crosspoint address memory HSRS holds in its storage location assigned to time position y the address of crosspoint pair e.

During the time corresponding to time slot b the information held in frame storage section VSGI of storage unit SE3 and coming from time slot a on PCM trunk PCM1 is coupled to outgoing line pair PCM3g of PCM trunk PCM3. To this end, address memory section HSV1 of said storage unit holds in the storage location corresponding to time position b the address of storage location y+1 in frame storage section VSGI as well as a criterion initiating the signal flow to the PCM trunk.

Like processes are performed in the opposite direction, i.e., data from time slot b on incoming line pair PCM3k are entered into frame storage section VSKI of storage unit SE3, transferred from there during time position y via link ZL1 to frame storage VSG1 of storage unit SE2, retransmitted from there during switching time position x to frame storage section VSGI of storage unit SE1 and, finally, coupled to line wire PCM1g of PCM trunk PCM1 during the time position corresponding to time slot a.

The following is a description of a third characteristic operation of the switching arrangement according to the invention with reference to FIG. 4. This operation provides a return connection to the outgoing line pair of the same PCM trunk. It is assumed that a call is to be established between time slot m and time slot i of PCM trunk PCM1. Accordingly, data supplied in time slot m on the incoming line pair PCM1k are written into the corresponding storage location with address m of frame storage section VSKI of memory unit SE1. During time position i these data are supplied to outgoing line pair PCM1g of the same PCM trunk PCM1. For this purpose address memory section HSV1 in the storage location corresponding to time slot i holds the address of storage location m of frame storage section VSKI, as well as a trigger signal that initiates a readout from the frame storage section to the PCM trunk. Like processes take place for the opposite direction, i.e., data of time slot i are transferred to the corresponding storage location of frame storage VSKI and are supplied during time position m to outgoing line pair PCM1g. The above explanation shows that the space-division section of the switching network is not required for this return switching operation.

The principles of the invention are described hereinabove by describing a preferred form of switching arrangement, constructed accordingly, and its operating principles for carrying out various forms of switching functions. The specifically described form of construction and corresponding principles of operation can be modified or changed in ways known to those skilled in the art while remaining within the scope of the invention as defined by the appended claims.

We claim:

1. In a switching unit of a PCM/TDM telecommunication system, said switching unit being individually assigned to one of a plurality of PCM trunks, each PCM trunk having incoming and outgoing lines, said switching unit including an address memory and a frame storage assigned to each direction of transmission over said PCM trunks for storing transmitted information, said switching unit being connected to space division switching means for connecting said switching unit with other switching units in said telecommunication system, said space division switching means including matrix crosspoints in direct communication with said frame storages, said crosspoints and said frame storages being selectively activated in response to information contained in said address memories, said telecommunication system being arranged in a time-space-space-time switching configuration, the improvement comprising:

an integral storage unit assigned to said PCM trunk comprising first and second frame storages for storing transmitted information and an address memory for storing address information, said first frame storage being coupled to said incoming lines of said PCM trunk for storing information from said PCM trunk and said second frame storage being coupled to said space division switching means for storing information from other switching units in said telecommunication system, said first and second frame storages each being coupled to both said outgoing lines of said PCM trunk and said space division switching means for selectively reading out the information stored therein; and control means connected to said storage unit for enabling said first and second frame storages to read in information from said PCM trunk and said space division switching means, respectively, in successive cycles and for selectively enabling said first and second frame storages to read out information stored therein to said outgoing lines of said PCM trunk or said space division switching means, said control means being responsive to the address information stored in said address memory in said integral storage unit to selectively read out information stored in said first and second frame storages to either said PCM trunk or said space division switching means.

2. The switching unit defined in claim 1 wherein said address memory in said integral storage unit comprises a first portion for storing the address information for accessing said outgoing lines of said PCM trunk and a second portion for storing the address information for accessing said space division switching means.

3. The switching unit defined in claim 2 wherein said first and second portions of said address memory in said integral storage unit also store information controlling the direction of transfer.

* * * * *